United States Patent [19]

Jackson et al.

[11] Patent Number: 4,733,927
[45] Date of Patent: Mar. 29, 1988

[54] STRESS WAVEGUIDES IN BULK CRYSTALLINE MATERIALS

[75] Inventors: Deborah J. Jackson, Port Hueneme; Marion D. Clark, Los Angeles, both of Calif.

[73] Assignee: Hughes Aircraft Company, Los Angeles, Calif.

[21] Appl. No.: 671,523

[22] Filed: Nov. 14, 1984

[51] Int. Cl.$^4$ .................... G02B 6/10; G02B 6/12
[52] U.S. Cl. ........................ 350/96.12; 350/96.14
[58] Field of Search ............. 350/96.12, 96.13, 96.14

[56] References Cited

U.S. PATENT DOCUMENTS 4,561,718 12/1985 Nelson ..................... 350/96.12

FOREIGN PATENT DOCUMENTS 2029083 3/1980 United Kingdom ........... 350/96.13

OTHER PUBLICATIONS

"High Speed Mach-Zehnder Modulator" by Gee et al., Proceedings of the Society of Photo-Optical Instrumentation Engineers, vol. 408.
"Thermo-Optic Effect in LiNbO$_3$ for Light Deflection and Switching" by Haruna et al., Electronics Letters, Oct. 29, 1981, vol. 17, No. 22.
"Optical-Waveguide Hybrid Coupler" by Massyuki et al., Optics Letter, Nov. 1982, vol. 7, No. 11.
"High Speed Traveling-Wave Directional Coupler Switch/Modulator" by Alferness et al., Journal of Q. Electronics, vol. QE-19, No. 9, Sep. 1983.
"Strain-Induced Optical Waveguiding in GaAs Epitaxial Layers at 1.15 mm" by L. D. Westbrook et al., Electronics Letters, vol. 15, No. 3, 1979, pp. 99–100.
"Photo Elastic Channel Optical Waveguides in Epitaxial GaAs Layers" by L. D. Westbrook et al., Electronics Letters, vol. 16, No. 5, Feb. 28, 1980, pp. 169–170.
"Stress in Chemical-Vapor Deposited SiO$_2$ and Plasma-SiN$_x$ Films on GaAs and Si" by Blaauw, Journal of Applied Physics, vol. 54, No. 9, Sep. 1983, pp. 5064–5068.
"Reactive Plasma Deposited Si-N Films for MOS-LSi Passivation" by Sinha et al., Journal of the Electrochemical Society: Solid State Science and Technology, vol. 125, No. 4, Apr. 1979, pp. 601–608.
"Photoelastic Waveguides and Their Effect on Stripe-Geometry GaAs/Ga$_{1-x}$Al$_x$As Lasers" by Kirkby et al., Journal of Applied Physics, vol. 50, No. 7, Jul. 1979, pp. 4567–4579.
"Proton-Implanted Optical Waveguide Detectors in GaAs" by Stoll et al., Applied Physics Letters, vol. 23, No. 12, Dec. 15, 1973, pp. 664–665.

Primary Examiner—William L. Sikes
Assistant Examiner—Akm E. Ullah
Attorney, Agent, or Firm—V. D. Duraiswamy; V. G. Laslo; A. W. Karambelas

[57] ABSTRACT

An optical waveguide is established near the surface of a body of bulk, optically transparent, crystalline material (12) by depositing and bonding a thin layer of material (16) that undergoes an irreversible structural transition under annealing such as silicon nitride or silicon oxide on a surface of the bulk crystalline material (12). The assembly is then heated to change the state of the thin layer and produce stress on the order of $10^{10}$ to $10^{11}$ dynes per square centimeter or more. Open guideways or breaks (22, 24) are then formed in the thin layer (16), thereby establishing optical stress waveguides (32, 34) in the bulk crystalline material (12), just under the open guideways. The bulk crystalline material is then employed for modulation, detection or in other interactive processes with respect to optical signals applied to the waveguide.

37 Claims, 4 Drawing Figures

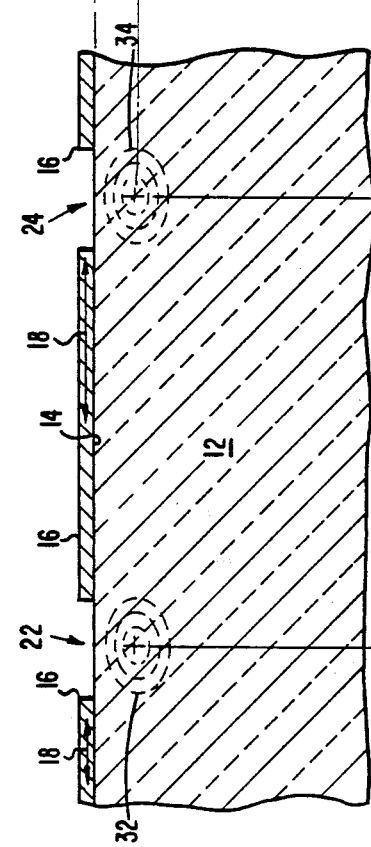
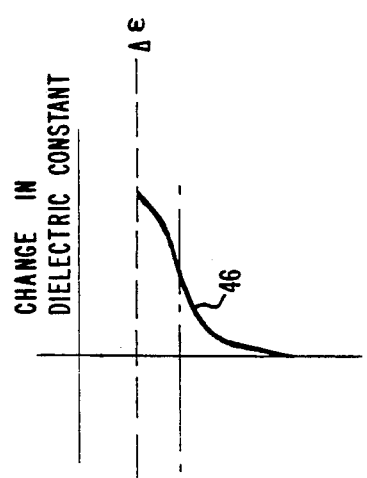
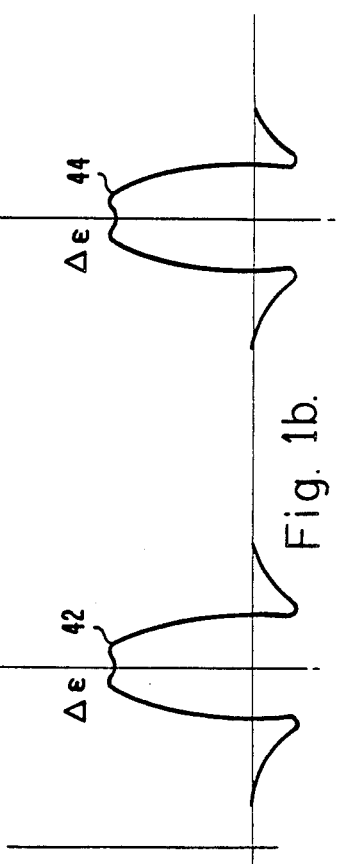

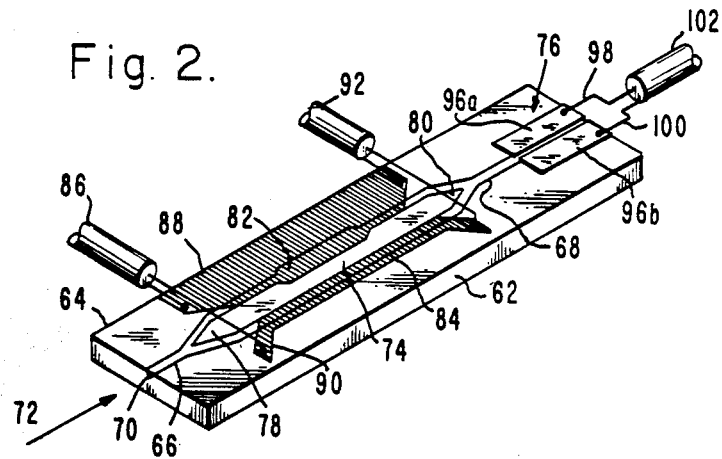

STRESS WAVEGUIDES IN BULK CRYSTALLINE MATERIALS

The Government has certain rights in this invention pursuant to Contract No. MDA904-82-C-0407, awarded by the Department of the Maryland Procurement Office.

BACKGROUND OF THE INVENTION

This invention relates to the fabrication of optical waveguides and, more particularly, to the fabrication of stress induced optical waveguides in bulk crystalline materials.

A variety of optical waveguide structures have been proposed and manufactured in semiconductor materials. These include guiding structures made from thin films and etched ribs, as well as guiding regions made from materials doped with metallic atoms. A more recent development has been the discovery that semiconductor doping can be combined with a material's elasto-optical properties to produce waveguide structures.

It is known that light can be confined along an axis normal to adjacent epilayer surfaces in some semiconductor materials. This is typically accomplished by epitaxial growth of n− type material having a given free carrier plasma density (on the order of $10^{18}$ excess electrons/cm$^3$) on n+ type material having a much lower free carrier plasma density (on the order of $10^{15}$ excess electrons/cm$^3$). A free carrier differential between adjacent epitaxial layers of semiconductor material creates a change in the refractive index seen by light traversing the interface region between the layers. Light entering the interface region within the appropriate solid angle, is reflected back into the semiconductor material having the higher index of reflection leading to the confinement of one or more modes of light in that region. Therefore, a waveguide structure can be constructed from two layers of n+ type semiconductor material positioned on either side of a layer of n− type material for the same semiconductor material.

It is also known that one of the epilayers can be replaced with a thin strip of metal bonded to the surface of the n− type epilayer. The metal strip alters the free carrier density just below the surface of the semiconductor material which also confines light as in the n+ layer arrangement. However, confinement of light laterally or parallel to the epilayer interfaces requires additional interface structures or alteration of material properties within the epilayer to vary the refractive index within the epilayer.

In order to obtain lateral confinement, L. D. Westbrock et al proposed the use of stress in the n− epilayer material to provide variations in the refractive index. See "The Strain Induced Waveguiding in GaAs Epitaxial Layers at 1.15 μm" L. D. Westbrock et al, Electronics Letters, Vol. 15, No. 3, Feb. 1, 1979, pp. 99–100 and "Photoelastic Channel Optical Waveguides in Epitaxial GaAs Layers" by L. D. Westbrock et al, Electronics Letters Vol. 16, No. 5, Feb. 28, 1980, pp. 169–170. Stressing a material alters the dielectric constant of the material through the photo-elastic effect similar to the change in the dielectric constant affected by a voltage through the photo-optic effect. This is discussed in relation to semiconductor lasers in "Photoelastic Waveguides and Their Effect on Stripe-Geometry GaAs/Ga$_{x}$Al$_{x}$As Lasers" by P. A. Kirkby, P. R. Selway and L. D. Westbrock, Journal of Applied Physics, Vol. 50, No. 7, July 1979, pp. 4567–4579.

In the case of stripe-geometry lasers, it was discovered that commonly used surface coatings can cause weak waveguiding regions in n− type epilayers due to induced stress. Westbrock et al employ a thin strip of silicon dioxide or a metal film deposited along a planar epilayer of n− type gallium arsenide grown on a heavily "doped" n+ gallium arsenide substrate. The vertical trapping of the light to the thin n− epilayer is achieved as described above because of the free carrier distribution. Guiding in the lateral or horizontal direction is provided by stress induced in the n− epilayer as a result of the difference in the coefficient of expansion between the film and the gallium arsenide. A thin film firmly bonded to the surface of GaAs transfers stress into the material as the two expand or contract. Westbrock et al achieve stress on the order of $1 \times 10^8$ to $5 \times 10^9$ dynes/cm$^3$ with this technique.

The magnitude of the change in the index of refraction induced in the n− epilayer is proportional to the difference between the temperature of deposition of the film and the operating temperature of the waveguiding material. Relying on the disparity in material thermal expansion alone, however, does not provide large enough variations in the index of refraction in the n− epilayer to achieve waveguiding without the assistance of the n+ epilayer structure in confining light close to the surface of the n− epilayer where it can sample the index difference.

However, the n +type of epilayer structure tends to be lossy, since a heavily doped n +GaAs substrate is strongly absorptive and rapidly attenuates the confined light. Therefore, even though waveguiding is achieved, the transmission losses of the guide quickly dissipate optical energy and limit usefulness.

This technique is limited to epilayer structures in materials that lend themselves to the appropriate doping levels. Bulk crystalline materials with desirable optical properties cannot be used by this technique. Some materials, such as ADP or KNbO$_3$, are extremely difficult to grow in epilayer structures.

It is also desirable to be able to use a broader class of materials, especially nonlinear materials, that allow increased optical intensities and unique optical processing abilities in addition to simply guiding optical radiation. There may also be manufacturing and cost restrictions of epilayer materials due to the required precision for assuring single mode operation.

Accordingly, a principal purpose of the present invention is to provide a method for producing optical waveguides and waveguide devices in bulk crystalline materials which are more efficient and less lossy than previously demonstrated stress waveguides.

SUMMARY OF THE INVENTION

In accordance with the present invention, stress waveguides are provided by bonding a thin layer of material to the surface of a body of optically transparent crystalline material, annealing the thin film to place it under substantial compressive stress and providing open guideways extending through the thin layer to the surface of the bulk crystalline material. The thin layer comprises a material such as silicon/nitrogen or silicon/oxygen compounds, or mixtures thereof, which undergo structural phase transitions at temperatures on the order of 350° C. or greater which causes a high level of stress in the material. When the thin layer is stressed on the order of $10^{10}$ to $10^{11}$ dynes/cm$^2$, single mode stress waveguides are formed in the bulk crystalline material immediately below the open guideways.

The optical waveguides may be employed in a variety of devices, including Mach-Zehnder modulators, detectors, switches, and other related devices where the properties of the bulk crystalline material are useful in the detection or processing of optical signals.

Other purposes, features and advantages of the invention will become apparent from a consideration of the following detailed description and from the accompanying drawings.

BRIEF DESCRIPTION OF THE DRAWINGS

FIG. 1a is a cross-sectional view of stress waveguides formed in bulk, optically transparent, crystalline material according to the present invention.

FIG. 1b is a profile of the dielectric constant plotted along a lateral centerline through the waveguides of FIG. 1.

FIG. 1c is a profile of the dielectric constant plotted along a vertical centerline through the waveguides of FIG. 1.

FIG. 2 illustrates an optical waveguide device utilizing the principles of the present invention.

DETAILED DESCRIPTION

Referring more particularly to the drawings, FIG. 1a illustrates two stress induced waveguiding structures in bulk crystalline material.

More specifically, FIG. 1a shows a body of bulk crystalline material 12 which can be a material such as, but not limited to, gallium arsenide or indium phosphide. In order to minimize absorption of optical radiation by the waveguide material as discussed previously, it is preferable to use a semi-insulating or n⁻ type material for bulk crystalline material 12. In addition, the material comprising bulk crystalline material 12 should be substantially optically transparent for the wavelengths of radiation that the waveguides are intended to transmit.

A thin film layer 16 for producing stress in bulk material 12 is deposited on surface 14 of bulk material 12. Layer 16 comprises material that exerts a minimum post annealing stress as discussed below, on the order of $10^{10}$ to $10^{11}$ dynes/cm$^2$. Layer 16 can comprise several materials, such as silicon/nitrogen or silicon/oxygen compounds, or mixtures thereof, that are employed as thin film layers or coatings in the semiconductor or optical waveguide arts. A critical requirement is that the material comprising layer 16 must undergo a permanent structural phase transition during annealing at temperatures on the order of 400° C., or more, which increases the intrinsic stress present in layer 16 during use. The material comprising layer 16 must, of course, also be compatible with bulk crystalline material 12, be capable of bonding to surface 14, and possess either conductive or non-conductive properties as desired, for a particular application. The exact material chosen for thin film layer 16 is determined by the final value of stress desired, as discussed below, and its compatibility with the desired waveguide application.

In the preferred embodiment, layer 16 comprises a silicon/nitrogen compound such as, but not limited to, silicon monoxide, silicon dioxide or silicon oxynitride are also useful for realizing the present invention.

The silicon/nitrogen compound is deposited on surface 14 employing known deposition techniques as a thin substantially uniform film and bonded to the upper surface 14 of bulk crystalline material 12. An exemplary deposition technique for silicon nitride is to expose surface 14 of bulk material 12 to a mixture of silane and nitrogen or silane and ammonia gases at a temperature of approximately 300° C. The process is continued until a thin film on the order of 1.0 μm in thickness is produced. Care must be taken prior to deposition to thoroughly clean or etch surface 14 to provide maximum adhesion and bonding of the silicon/nitrogen compound to surface 14.

The silicon nitride film is then subjected to annealing or a heat treatment at a temperature greater than 400° C. in order to reorder the structure of the material through a phase transition and irreversibly increase the stress present in the material. A typical annealing cycle requires the film to be maintained at 500° C. for approximately ½ hour. It is readily appreciated by one skilled in the art that the annealing cycle varies for different materials and thicknesses according to the desired stress. The annealing process must provide sufficient heat to alter the structure of layer 16 and establish a minimum stress. Some thin films less than 1.0 μm thick, while easily restructured by the heat, require more heat to produce an equivalent stress in the final film. This is known to be true for thin films of silicon nitride. For example, a silicon nitride film of only 0.4 μm would require annealing at a temperature on the order of 575° C. to produce substantially equivalent stress at the interface between layer 16 and surface 14 as in the 1.0 μm film discussed above.

Open guideways or channels 22 and 24 are formed in layer 16 so as to effect the transfer of stress into bulk material 12 in preselected regions. The lack of stressed material in the area of guideways 22 and 24 greatly decreases the stress transferred into bulk material 12 under these areas as described below. In fact equal but oppositely directed stress forces occur in bulk material 12 at the edges of guideways 22 and 24. In order to form guideways 22 and 24, a photoresist coating (not shown) is deposited on layer 16 and subsequently exposed through a patterned screen or mask. When employed with negative type photoresists, the mask is an image of the guideway pattern desired and prevents resist exposure in the guideway regions. For positive type photoresists, the mask is the negative image.

Once the photoresist is exposed, conventional processing is employed to remove the photoresist from areas to be occupied by guideways 22 and 24. Plasma etching is then employed to remove the unprotected material of layer 16 and provide laterally extending guideways 22 and 24. The material comprising layer 16 in the regions of guideways 22 and 24 is completely etched away to fully expose surface 14 so as to provide a maximum benefit of the stress from the edges of layer 16 defining guideways 22 and 24.

Guideways 22 and 24 are representative of the guideways that can be etched in layer 16 to provide a variety of guideway shapes, inter-connections and configurations. The guideways determine the location and size of waveguide regions within bulk crystalline material 12, and as such, their configuration is predetermined by the application required for the optical device being manufactured. Simple straight waveguides may be produced by the method of the present invention or more complex intersecting waveguides for complex optical circuits. In addition, the width of guideways 22 and 24 need not be uniform in size, since variations in the amount of stress applied over a given surface area affects the size of the waveguide and type of modes or wavelengths that can be confined. Therefore, for integrated optics devices in bulk materials, this invention can provide for a variety of waveguide dimensions in a single material.

The heat treatment of the silicon nitride serves to change the state of the silicon nitride through a structural phase transition within the material layer so that it creates high tensile stress in the thin film of layer 16. The exact nature of the mechanism by which the stress is altered is not fully understood; however, the alteration of stress levels has been verified in actual processing.

The high tensile stress within layer 16 creates a high compressive stress field in bulk crystalline material 12 adjacent to layer 16. The compressive stress is relieved under guideways 22 and 24 which creates tensile stress in these regions of bulk material 12. This affects the dielectric constant and refractive index of bulk crystalline material 12, as indicated by the plots of FIG. 1. More specifically, in FIG. 1b, the vertical axis represents the change in dielectric constant $\epsilon$ while the horizontal line represents the lateral position x, in the main body of the bulk crystalline material 12. In FIG. 1b, peaks 42 and 44 indicate significant changes in the dielectric constant and, therefore, in the refractive index, along the lateral direction of bulk material 12 through the center of the volumes 32 and 34 of FIG. 1a, where the stress waveguides are formed. In FIG. 1c peak 46 indicates the significant changes in the dielectric constant $\epsilon$ in the vertical direction of the material in volumes 32 and 34 of FIG. 1a.

It is the transfer of sufficiently large quantities of stress into bulk crystalline material 12 and the resultant vertical variation in the index of refraction, in addition to the lateral variations, in volumes or waveguides 32 and 34 that allows the use of bulk materials without the aid of any epilayer structure.

Because of the complex factors involved in stress determination, the stress produced within the thin film of layer 16 defines the criteria for producing the desired optical waveguides. More specifically, the stress in layer 16 is preferably on the order of $10^{10}$ to $10^{11}$ dynes/cm$^2$ to obtain single mode waveguides in volumes 32 and 34. In this regard, while adequate containment is obtained with stress on the order of $10^{10}$ dynes/cm$^2$, it is more preferable to have a stress value within the range of $2 \times 10^{10}$ to $8 \times 10^{10}$ dynes/cm$^2$, with $3 \times 10^{10}$ dynes/cm$^2$ being the most preferred value.

On the other hand, unduly high stress is neither necessary nor desired. If the stress is excessive, it may produce multi-mode waveguides by altering very large volumes of bulk material 12. Also, excessive stress can lead to structural failure or cracks in layer 16 or in bulk material 12. Multi-mode waveguides may be allowable for some applications, but the majority of advanced optical waveguide applications require single mode waveguides.

The exact value of stress required to establish a light guiding path in bulk crystalline material is dependent upon the elasto-optical coefficient of the material comprising bulk crystalline material 12. This coefficient, which is known in the art for given materials, determines the stress that must be applied to the material to achieve the desired shift in the refractive index. The desired shift in refractive index is dependent on the effective mode index required to confine the lowest order mode in the waveguide. The effective mode index is defined by R. G. Hunsperger in *Integrated Optics: Theory and Technology*, by R. G. Hunsperger, Springer Verlag, N.Y., 1982, pp 16–46.

In general, the shift in the refractive index of bulk crystalline material 12 should be roughly $10^{-2}$ at or near the surface. This corresponds to an effective mode index shift on the order of $10^{-4}$ in waveguiding volumes 32 and 34 below the surface of bulk material 12. For a waveguide positioned approximately 7 $\mu$m deep along the z axis of a GaAs substrate this effective mode index is sufficient to confine the lowest order mode. For any other material, one can calculate the required effective index needed to confine the lowest order mode.

The stress induced shift in the index of refraction of bulk crystalline material 12 in the waveguiding zone is proportional to the product of the elasto-optic tensor and the components of the elastic strain matrix. Stated another way, the known elasto-optic coefficients of bulk material 12 determines the amount of stress that must be applied to achieve an effective refractive mode index change or shift of $10^{-4}$ or greater. The tensor computations are discussed in more detail in the P. A. Kirkby and P. R. Selway article discussed above, and appearing in the Journal of Applied Physics, Vol. 50, No. 7 at page 4571.

For the exemplary silicon nitride layer 16 of the preferred embodiment, a stress of around $3 \times 10^{10}$ dynes/cm$^2$ provides sufficient stress that the product of the stress and the elasto-optic tensor for silicon nitride produces an index shift on the order of $10^{-4}$.

The stress in layer 16 has been described so far in terms of tensile stress. However, it is possible to achieve the purposes of the present invention with layer 16 under either compressive or tensile stress, depending on the nature of the deposition and annealing processes. In FIG. 1a., arrows 18 included in layer 16 indicate force vectors for tensile stresses. Two articles which discuss both tensile and compressively stressed silicon/nitrogen compound depositions are:

"Stress in Chemical Vapor Deposited SiO$_2$ and Plasma SiN$_x$ Films on GaAs and Si" by C. Blaauw, Journal of Applied Physics, Vol. 54, No. 9, September 1983, pp. 5064–5068.

"Reactive Plasma Deposited Si-N Films for MOS-LSI Passivation" by A. K. Sinha, et al, Journal of the Electrochemical Society: SOLID-STATE SCIENCE AND TECHNOLOGY, Vol. 125, No. 4, April 1979, pp. 601–608.

In the preferred embodiment of FIG. 1, bulk material 12 under the stressed film of layer 16 experiences compressive stress due to the tensile stress in layer 16. The volume of bulk material 12 under open guideways 22 and 24, however, experiences tensile stress and produces waveguides 32 and 34. Accordingly, if compressive stress in layer 16 is employed, the layer 16 material is etched from all of surface 14 except over desired waveguiding regions, since the direction of the various stress vectors signs are now reversed.

It is also important to notice the effect of the width of guideways 22 and 24 on the dimensions of waveguides 32 and 34. The compressive stress applied to bulk material 12 decreases as you move closer to or under layer 16. Therefore, the width of the stressed volumes 32 and 34 depend on the width of guideways 22 and 24. However, as the guideways increase in size, the increased volume of material allows for a relaxation effect and the stress change becomes less abrupt. In other words, the width of volume under large compressive stress does not increase linearly with guideway width. This means that variations in the width of guideways 22 and 24 within certain limits does not cause major changes in the dimensions of waveguides 32 and 34. The advantage of this effect is that single mode waveguide dimensions are achieved with less strict manufacturing tolerances for the layer etching than in other waveguide techniques. In typical film or rib waveguide structures, the wider the material, the larger the waveguide and the more modes that are supported, thus requiring high tolerance manufacturing.

It is useful to summarize the steps which may be employed in producing the stress waveguides which illustrate the present invention. The steps include:

1. Deposition of $SiN_x$ or other silicon/nitrogen compounds at approximately 300° C. on a bulk, optically transparent, crystalline substrate to form a thin film layer.

2. Annealing at a temperature of 400° C. or more, for approximately ½ hour or such time as is required to establish a minimum stress in the thin film between $10^{10}$ to $10^{11}$ dynes/cm$^3$.

3. Use conventional mask and plasma etching processes to remove the thin film down to the bulk material in a predetermined pattern.

4. Remove any remaining photo-resist and polish or cleave the ends of the bulk material to facilitate end coupling into the waveguides, where necessary.

EXAMPLE

Tests were made using a bulk crystalline slab or substrate 12 of gallium arsenide approximately 10 mils or 0.010 inch thick. Several silicon nitride layers 16 varying in thickness from 0.4 $\mu$m to about 1.0 $\mu$m thick were deposited on the substrate. In addition, various widths for the opening dimensions of guideway 22 were tested, with widths from about 1.0 $\mu$m to about 10.0 $\mu$m, in 0.5 increments. Using approximately a 7.0 $\mu$m wide open guideway, a single mode stress optical waveguide 32 is produced that is about 8.0 $\mu$m width and about 7.0 $\mu$m high.

Referring now to FIG. 2 an optical device 60 employing waveguides 66, 68, 82 and 84 produced by the method of the present invention is illustrated. Stress waveguides in bulk crystalline, materials are useful in a number of applications including optical processors, couplers, multiplexers, demultiplexers, spectrum analyzers, and detectors. FIG. 2 illustrates one exemplary embodiment for an optical processing device.

Device 60 employs a Mach-Zehnder modulator 74 patterned after that described in an article entitled "High Speed Mach Zehnder Modulator," by C. M. Gee and G. D. Thurmond, SPIE Code No. 408-16. In addition, a detector 76 similar to that described in the article entitled "Proton-Implanted Optical Waveguide Detectors in GaAs," by H. Stoll and A. Yariv, Applied Physics Letters, Vol. 23, No. 12, Dec. 15, 1973, pp. 664, is employed More specifically, in FIG. 2, a semiconductor base 62, suitably of gallium arsenide or indium phosphide, may be employed. The upper surface base 62 is provided with a coating 64 of silicon nitride. Following heat treatment as previously discussed, guideways over waveguides 66 and 68, together with divided pathways between these two guideways, may be etched through the silicon nitride layer 64, producing the desired stress waveguides immediately below the guideways. The end of the stress waveguide 66 is indicated by a circle 70 at the end of plate 62. An optical signal is launched into device 60 at this point, as indicated by arrow 72.

A signal applied to optical waveguide 66 is divided into two signals at a Y-junction 78 and recombined at a Y-junction 80. If the two signals are 180 degrees out of phase when recombined at junction 80, they will cancel out, and no signal will be detected at detector 76. On the other hand, if they are in phase at junction 80, then they will be at full intensity as they are recombined, and a significant optical signal will be observed at detector 76. Incidentally, as discussed in the article by Gee and Thurmond, cited above, it is desirable to have a normal phase bias between the two branch paths of 180 degrees, and this is introduced by making waveguide 82 somewhat broader than opposing waveguide 84. Modulation is accomplished by the application of a voltage on a transmission line 86 to electrodes 88 and 90.

Light propagating through the Mach Zehnder waveguide arms 82 and 84 can be attenuated by the presence of metallic electrodes 88 and 90. Therefore, to prevent this, a 0.25 $\mu$m thick barrier layer is typically deposited over substrate 64 prior to deposition of the electrodes.

A matched termination 92 can be provided at the other end of the electrodes 88 and 90. Depending on the voltages applied to electrodes 88 and 90 from transmission line 86, the optical signals passing down the two branch paths will be shifted in phase so that they will combine either in phase or out of phase at junction 80, thereby accomplishing the desired modulation. The crystal orientation of semiconductor plate 62 should be with the <100> orientation perpendicular to the substrate surface. Further, the waveguide regions 82 and 84 should be parallel to the <110> orientation in order to assure proper coupling between the electrical field of electrodes 88 and 90 and the optical throughput of the waveguides.

Detector 76 utilizes upper electrode plates 96 which may make a Schottky barrier contact with semiconductor material 62 along parallel areas on both sides of waveguide 68. A d.c. voltage is applied to electrodes 96a and 96b from leads 98 and 100 associated with coaxial line 102 to bias one of the junctions in the forward direction and the other in the reverse direction. Prior treatment of the waveguide area by proton implantation damages the crystalline structure and causes the previously low loss waveguide to become highly absorptive for radiation around 1 $\mu$m wavelength. Free carriers are generated by the absorbed photons and photodetection results when these carriers are swept through the depletion layer generated by a reverse biased Schottky barrier. In FIG. 2 this reverse bias is provided by voltages applied to leads 98 and 100 associated with the coaxial output line 102.

It is to be understood that the showing of the device of FIG. 2 is merely schematic, and indicates the utility of the present waveguides in semiconductor material. It is also noted that the actual waveguides would be relatively smaller, and the angles of separation and rejoining of junctions 78 and 80 would actually have somewhat smaller angles, preferably less than 1 degree, to avoid reflections or other undesired losses.

The foregoing description of preferred embodiments has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. An optical waveguide device comprising:
   a body of bulk, substantially optically transparent, crystalline material having a first predetermined surface;
   a first zone comprising predetermined areas of said surface defining said bulk crystalline material underlying said first zone areas; a second zone comprising areas of said surface immediately adjacent to said first zone; and
   means for providing substantial levels of compressive stress in said bulk crystalline material under said first zone sufficient to produce at least one single mode stress waveguide therein, said means including a thin layer of heat-treated material under substantial stress on the order of $10^{10}$ to $10^{11}$ dynes per square centimeter or more bonded to said surface and covering only one of said zones.

2. The device of claim 1 wherein said means for providing substantial levels of streee provides sufficient stress in said bulk crystalline material to shift the index of refraction under said first zone by a factor greater than $10^{31\,4}$.

3. The device of claim 1 wherein said thin layer of heat treated material is compound of silicon and nitrogen.

4. The device of claim 1 wherein said thin layer is heat-treated silicon nitride.

5. The device of claim 1 wherein said thin layer is a compound of silicon and oxygen.

6. The device of claim 5 wherein said thin layer is heat-treated silicon monoxide.

7. The device of claim 5 wherein said thin layer is heat-treated silicon dioxide.

8. The device of claim 1 wherein said compressive stress is on the order of $10^{10}$ to $10^{11}$ dynes per square centimeter or more.

9. The device of claim 1 wherein said compressive stress is on the order of $2 \times 10^{10}$ to $8 \times 10^{10}$ dynes per square centimeter.

10. The device as recited in claim 1 wherein said means for providing substantial levels of compressive stress comprises:
    a thin layer of material bonded to said first predetermined surface, said thin layer being under sufficient stress to produce a shift in the index of refraction by a factor of greater than $10^{-4}$ under said first zone of said bulk crystalline material;
    said thin layer being interrupted by open guideways on the order of 2 $\mu$m to 10 $\mu$m in width extending along said first predetermined surface in a predetermined pattern, whereby single mode optical stress waveguides are produced within said bulk crystalline material immediately below said open guideways as a result of the surface stresses produced by said thin layer.

11. The device of claim 1 further comprising means for directing optical signals into said stress waveguide.

12. The device of claim 1 further comprising means for detcting optical signals.

13. The device of claim 1 further comprising means for switching optical signals.

14. The device of claim 1 further comprising means for multiplexing optical signals.

15. The device of claim 1 further comprising electrode means for modulating optical signals in said bulk crystalline material.

16. The optical waveguide device of claim 1 wherein said bulk crystalline material comprises a III-V compound.

17. The optical waveguide device of claim 1 wherein said bulk crystalline material comprises a compound selected from the group of gallium arsenide, indium, phosphide potassium niobate and ADP.

18. The optical waveguide device of claim 1 wherein said bulk crystalline material comprises gallium arsenide.

19. A method for forming optical waveguide devices in bulk optically transparent crystalline material comprising the steps of:
    depositing a thin layer of material bonded onto the surface of the body of bulk crystalline material;
    heating said thin layer to change the state of said layer and stress the layer to a final stress level relative to the surface of said bulk crystalline material sufficient to produce a shift in the index of refraction of said bulk crystalline material sufficient for confining optical radiation; and
    masking and etching open guideways through said thin layer approximately 1 $\mu$m to 10 $\mu$m in width in a predetermined pattern, whereby single mode stress optical waveguides are formed in the bulk crystalline material adjacent to the surface thereof immediately below the longitudinally extending guideways.

20. The method of claim 19 wherein said step of depositing a thin layer of material includes the step of depositing $SiN_x$.

21. A method of claim 19 wherein said step of depositing a thin layer of material includes the step of depositing $SiO_x$.

22. The method of claim 19 including the step of heating said thin layer of material until a final stress on the order of $10^{10}$ to $10^{11}$ dynes per square centimeter is achieved.

23. The method of claim 19 including the step of heating the phase transition material until a final stress in the order of $3 \times 10^{10}$ to $8 \times 10^{10}$ dynes per square centimeter is achieved.

24. The method of claim 19 including the step of forming branching optical stress waveguides within said bulk crystalline material.

25. The method of claim 19 including the steps of applying electrodes to said bulk crystalline material over said waveguides.

26. A method for forming optical waveguide devices in bulk semiconductor material comprising the steps of:
    depositing a thin layer of material bonded onto the surface of the body of semiconductor material;
    heating said thin layer of material to change the state of said layer and stress the layer to a final relatively high stress level relative to the surface of said semiconductor material, sufficient to make an abrupt change in the dielectric constant of the semiconductor material at the edges of said layer; and
    forming a breaks or guideways through the layer, whereby single mode stress optical waveguides are formed in the semiconductor material adjacent the surface thereof immediately below said breaks or guideways.

27. The method of claim 26 wherein said step of depositing a thin layer of material comprises depositing silicon nitride.

28. The method of claim 26 wherein said step of depositing a thin layer of material comprises depositing silicon monoxide.

29. The method of claim 26 including the step of applying electrodes to said semiconductive material in selected areas over said stress waveguides.

30. An optical waveguide device comprising:
a body of bulk, substantially optically transparent, semiconductor material having a first predetermined surface;
a first zone comprising at least one predetermined area of said surface, said area defining at least one predetermined region in said semiconductor material wherein at least one stress waveguide is formed, respective ones of said areas corresponding to respective ones of said regions;
a second zone comprising at least one area of said surface immediately adjacent to respective at least one said area of said first zone; and
means for providing substantial levels of compressive stress in said semiconductor material under said first zone sufficient to produce said at least one stress waveguide, said means including a thin layer of heat-treated material under substantial stress at least approximately on the order of $10^{10}$ dynes per square centimeter or more bonded to said surface and covering only one of said zones, said at least one stress waveguide produced thereby being a single-mode waveguide.

31. The device of claim 30 wherein said means for providing substantial levels of compressive stress provides sufficient stress in said bulk semiconductor material to shift the index of refraction under said first zone by a factor greater than $10^{-4}$.

32. The device of claim 30 wherein said thin layer of heat-treated material comprises a compound of silicon and nitrogen.

33. The device of claim 30 wherein said thin layer of heat-treated material is silicon nitride.

34. The device of claim 33 wherein said stress in said thin layer of heat-treated material is on the order of $2 \times 10^{10}$ to $8 \times 10^{10}$ dynes per square centimeter.

35. An optial waveguide device comprising:
a body of bulk, substantially optically transparent, semiconductor material having a first predetermined surface; and
a thin layer of material bonded to said first predetermined surface, said material being under substantial stress on the order of $10^{10}$ dynes per square centimeter or more relative to said body of semiconductor material;
said layer having a longitudinally extending open spaces or open guideways on the order of 1 $\mu$m to 10 $\mu$m in width extending along said first predetermined surface, whereby single mode optical stress waveguides are produced within said semiconductor material immediately below said open guideways as a result of the surface stresses produced by said layer.

36. The device of claim 35 wherein said thin layer of material is a heat-treated compound of silicon and nitrogen.

37. The device of claim 35 wherein said semiconductor material comprises a III-V compound.

* * * * *

UNITED STATES PATENT AND TRADEMARK OFFICE
CERTIFICATE OF CORRECTION

PATENT NO. : 4,733,927

DATED : March 29, 1988

INVENTOR(S) : Deborah J. Jackson et al.

It is certified that error appears in the above-identified patent and that said Letters Patent is hereby corrected as shown below:

Column 9, line 28, "stress instead of "stree".

Column 9, line 31, "$10^{-4}$" instead of "$10^{31\ 4}$".

Column 9, line 33, after "material is" insert --a--.

Column 10, line 13, after "indium" delete ", [comma]".

Column 10, line 14, after "phosphide" insert --, [comma]--.

Column 10, line 38, "$SiN_x$" instead of "$SiN_\chi$".

Column 10, line 41, "$SiO_x$" instead of "$SiO_\chi$".

Column 10, line 66, after "forming" delete --a--.

UNITED STATES PATENT AND TRADEMARK OFFICE
CERTIFICATE OF CORRECTION

PATENT NO. : 4,733,927

DATED : March 29, 1988

INVENTOR(S) : Deborah J. Jackson et al.

It is certified that error appears in the above-identified patent and that said Letters Patent is hereby corrected as shown below:

Column 12, line 23, after "having" delete -- a --.

Signed and Sealed this

Thirtieth Day of August, 1988

Attest:

DONALD J. QUIGG

*Attesting Officer*                    *Commissioner of Patents and Trademarks*